United States Patent [19]

Yashiro et al.

[11] Patent Number: 5,169,745
[45] Date of Patent: Dec. 8, 1992

[54] OPTICAL INFORMATION RECORDING MEDIUM

[75] Inventors: Tōru Yashiro, Yokosuka; Yutaka Ueda, Yokohama, both of Japan

[73] Assignee: Ricoh Company, Ltd., Tokyo, Japan

[21] Appl. No.: 577,877

[22] Filed: Sep. 5, 1990

[30] Foreign Application Priority Data

Sep. 12, 1989 [JP] Japan .................. 1-235962
Sep. 12, 1989 [JP] Japan .................. 1-235963

[51] Int. Cl.$^5$ .................................. G03C 1/72
[52] U.S. Cl. .......................... 430/495; 430/270; 430/945; 346/135.1
[58] Field of Search ............. 430/495, 945, 270, 271, 430/273; 346/135.1

[56] References Cited

U.S. PATENT DOCUMENTS

| 3,983,542 | 9/1976 | Ovshinsky | 430/346 |
| 4,188,214 | 2/1980 | Kido et al. | 430/495 |
| 4,499,178 | 2/1985 | Wada et al. | 430/495 |
| 4,899,168 | 2/1990 | Osato et al. | 430/945 |
| 4,981,772 | 1/1991 | Pan et al. | 430/346 |

FOREIGN PATENT DOCUMENTS

| 1080531 | 4/1986 | Japan | 346/135.1 |
| 2067742 | 3/1987 | Japan | 346/135.1 |

Primary Examiner—Lee C. Wright
Attorney, Agent, or Firm—Cooper & Dunham

[57] ABSTRACT

An optical information recording medium comprising a substrate and a recording layer, formed on the substrate, which comprises a composition of antimony, sulfur, and one element selected from the group consisting of the elements belonging to group IIB and group IVA of the periodic table.

6 Claims, 1 Drawing Sheet

OPTICAL INFORMATION RECORDING MEDIUM

BACKGROUND OF THE INVENTION

1. Field of the Invention

The present invention relates to an optical information recording medium, and more particularly to an optical information recording medium comprising a recording layer which comprises a composition of antimony, sulfur, and one element selected from the group consisting of the elements belonging to group IIB and group IVA of the periodic table.

2. Discussion of the Background

As the demand for recording large volumes of information signals on a recording medium at a high recording density is increasing, many kinds of information recording media have been proposed on the basis of various configurations and operation principles, and information signals are thus recorded therein at a high density and reproduced therefrom.

There are conventionally many kinds of recording methods using the abovementioned information recording media. For instance;

(1) Information signals are recorded on an information recording medium in such a fashion that pits or dents are formed on a thin recording layer which is overlaid on a substrate of the information recording medium by the application of a recording beam, for which the intensity is modulated in accordance with the information signals, to the recording side of the above-mentioned recording medium.

(2) Information signals are recorded on an information recording medium in such a fashion that an optical constant such as the refractive index of a thin recording film which is overlaid on a substrate of the information recording medium is changed by the application of a recording beam, for which the intensity is modulated in accordance with the information signals, to the recording side of the above-mentioned recording medium.

(3) Information signals are recorded on a magneto-optical recording medium in such a fashion that the magnetized direction of a thin recording film which is overlaid on a substrate of the magneto-optical recording medium is changed by the application of a recording beam, for which the intensity is modulated in accordance with the information signals, to the recording side of the above-mentioned recording medium.

Furthermore, to reproduce the information signal from the above-mentioned recording media, a laser beam with a predetermined intensity is applied to the recording media.

The aforementioned information recording methods have their own shortcomings.

The recording method (1) has the shortcoming that the reproduction C/N ratio is degraded when the pits or dents which are formed on the thin recording layer are deformed. In addition to the above, a protective layer cannot be overlaid on the thin recording layer.

In the recording method (2IVA), the phase of the recording layer is caused to change by the application of the laser beam thereto. According to this method, the information can be recorded on the medium and reproduced therefrom on the principle that the refractive index of the recording layer varies depending on its phase. For the material of this kind of recording layer, Te-Ge compounds, In-Se compounds, Sb-Se compounds and Se-Te compounds are generally used. When the above-mentioned compounds are used for the recording layer, a laser beam having an intensity of as great as 10 mW or more is required to change the recording layer from the amorphous phase to the crystalline phase. Furthermore, the phase change from the amorphous phase to the crystalline phase proceeds slowly because of the slow rate of the crystallization in the compound, so that information cannot be recorded on the medium and reproduced therefrom at high speed.

In the recording method (3), it is difficult to obtain an adequate C/N ratio because the reproduction output is small.

SUMMARY OF THE INVENTION

Accordingly, an object of the present invention is to provide an optical information recording medium, free from the abovementioned conventional shortcomings, which is capable of recording information signals thereon with high sensitivity at high speed in such a fashion that an optical constant of a recording layer thereof is caused to change by the application of a laser beam thereto, and reproducing information signals therefrom at a large C/N ratio.

The above-mentioned object of the present invention can be achieved by an optical information recording medium comprising a substrate and a recording layer formed thereon, which recording layer comprises a composition comprising (i) antimony, (ii) sulfur, and (iii) one element selected from the group consisting of the elements belonging to the group IIB and group IVA of the periodic table.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

An optical information recording medium according to the present invention comprises a substrate and a recording layer formed thereon, which comprises a composition comprising (i) antimony, (ii) sulfur, and (iii) one element selected from the group consisting of the elements belonging to the group IIB and group IVA of the periodic table.

Figure 1:
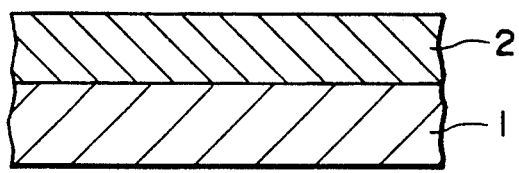
FIG. 1 is a schematic cross-sectional view of an example of the optical information recording medium according to the present invention.

FIG. 1 is a schematic cross-sectional view of an example of the optical information recording medium according to the present invention. The optical information recording medium shown in FIG. 1 is constructed in such a manner that a recording layer 2 is overlaid on a substrate 1.

Figure 2:
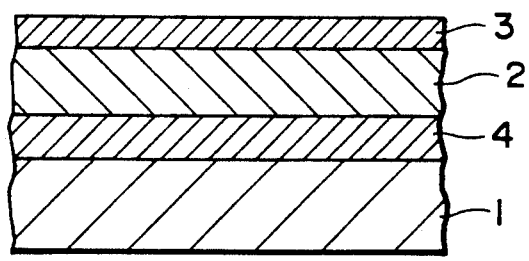
FIG. 2 is a schematic cross-sectional view of another example of the optical information recording medium according to the present invention.

When necessary, as shown in FIG. 2, an undercoat layer 4 may be interposed between the substrate 1 and the recording layer 2, and a protective layer 3 is formed on the recording layer 2.

A transparent plastic or glass sheet can be used for the substrate 1. More specifically, examples of the materials for the substrate 1 include polycarbonate resin, polyolefin resin, acrylic resin, epoxy resin, silica glass. Guide tracks and guide pits for guiding a laser beam spot and pregrooves for format information of address signals may be formed on the substrate 1.

The recording layer 2 is a thin film which comprises any of the following compositions:

$$Sb_xM_yS_z \tag{1}$$

where $0.5 \leq x < 1, 0 < y \leq 0.5, 0 < z \leq 0.5$, and $x+y+z=1$.

$$Sb_xM_yS_zA_\alpha \tag{2}$$

where $0.5 \leq x < 1.0 < y \leq 0.5, 0 < z \leq 0.5, < \alpha \leq 0.5$ and $x+y+z+\alpha=1$.

In the above formulas (1) and (2), M is an element selected from the group IIB of the periodic table. Of these elements Zn and Cd are more preferable.

In the formula (2), A represents an element selected from the elements in the group IIB except the elements represented by M; the elements in group IVB, group VB, group VIB, group VIIB, group VIII, group IB, group IIIA, and group IVA; and oxygen and nitrogen.

$$Sb_xM'_yS_z \tag{3}$$

where $0.5 \leq x < 1, 0 < y \leq 0.5, 0 < z \leq 0.5$, and $x+y+z=1$.

$$Sb_xM'_yS_zA'_\alpha \tag{4}$$

where $0.5 \leq x < 1, 0 < y \leq 0.5, 0 < z \leq 0.5$, and $0 < \alpha \leq 0.5$ and $x+y+z+\alpha=1$.

In the above formulas (3) and (4), M' is an element selected from the group IVA of the periodic table. Of these elements Sn and Pb are more preferable.

In the formula (4), A' represents an element selected from the elements which belong to the group IVA except the elements represented by M'; the elements in group IVB, group VB, group VIB, group VIIB, group VIII, group IB, group IIB, and group IIIA; and oxygen and nitrogen.

In the formulas (1) and (3), it is preferable that $0.6 \leq x < 0.8, 0 < y \leq 0.2, 0 < z \leq 0.2$, and $x+y+z=1$ from the viewpoints of the photosensitivity and the contrast between the optical constant of the amorphous phase and that of the crystalline phase.

In the formulas (2) and (4), it is preferable that $0.5 \leq x < 0.8, 0 < y \leq 0.2, 0 < z \leq 0.2, 0 < \alpha \leq 0.2$ and $x+y+z+\alpha=1$.

It is preferable that the thickness of the recording layer 2 be in the range of 100 to 3000 Å, and more preferably in the range of 300 to 1500 Å.

The recording layer 2 can be formed on the substrate 1 or on the undercoat layer 4 by vacuum-deposition by the resistance heating (binary vacuum-deposition or ternary vacuum-deposition), sputtering, or electron beam deposition.

The undercoat layer 4 is provided for the purposes of (i) protecting the recording layer 2 from water and gas; (ii) ensuring the preservation stability of the recording layer 2; (iii) improving the reflectance of the recording layer 2; and (iv) forming the pregrooves thereon.

When the above-mentioned purposes (i) and (ii) are important, polymeric materials such as an acrylic resin and an epoxy resin; inorganic compounds such as $SiO_2$, $MgF_2$, SIO, $TiO_2$, TiN, SiN and ZnS; and metals and metalloids such as Zn, Cu, S, Ni, Cr, Ge, Se, Ag, Au and Al can be used as the materials for the undercoat layer 4.

When great importance is attached to the above-mentioned purpose (iii), metals such as Al, Ag and Te may be used as the materials for the undercoat layer 4. In the case where the purpose (iv) is particularly important, various ultraviolet-curable resins, thermosetting resins and thermoplastic resins may be used.

The thickness of the undercoat layer 4, which varies slightly depending on the kind of material thereof, is appropriately in the range of 0.1 to 30 μm.

The protective layer 3 is provided for the purposes of (i) protecting the recording layer 2 from being impaired by flaws, dust, and stains, (ii) improving the preservation stability of the recording layer 2 and (iii) increasing the reflectance of the recording layer 2. The same materials as used in the undercoat layer 4 can be employed for the protective layer 3.

The thickness of the protective layer 3, which also varies slightly depending on the kind of material thereof, is appropriately in the range of 0.1 to 100 μm.

To form the protective layer 3 and the undercoat layer 4, a film-forming method under vacuum, such as vacuum-deposition or sputtering can be employed in the case where inorganic compounds are used as the material for these layers. In contrast to this, a solution coating method, such as spinner coating, spray coating or dip coating can be employed in the case where organic compounds are used for these layers.

To record information on the optical information recording medium according to the present invention, the optical constant of the recording layer 2 thereof is caused to change by the application thereto of a recording beam, for which the intensity is modulated in accordance with the information signals.

To reproduce the recorded information from the above-mentioned optical information recording medium, a laser beam with a smaller intensity than that used in the recording operation may be applied to the recording medium.

Other features of this invention will become apparent in the course of the following description of exemplary embodiments, which are given for illustration of the invention and are not intended to be limiting thereof.

EXAMPLE 1

Guide tracks were formed on the surface of a disk-shaped polycarbonate substrate with a diameter of 130 mm and a thickness of about 1.2 mm while the substrate was prepared by injection-molding.

A thin Sb-Zn-S film was vacuum-deposited on the above-prepared substrate by binary (Sb and ZnS) vacuum-deposition using a vacuum-deposition apparatus employing the resistance heating method under the following conditions, so that a recording layer was formed on the substrate. Thus, optical information recording medium No. 1 according to the present invention was prepared.

Degree of vacuum: $6 \times 10^{-6}$ Torr
Deposition speed: Sb .. 10 Å/sec,
ZnS .. 2 Å/sec It was confirmed by the Auger analytic device that the recording layer of the optical information recording medium No. 1 comprised a composition of $Sb_{0.7}Zn_{0.17}S_{0.13}$ with a uniform composition in the direction of the thickness thereof.

The thickness of the recording layer was 750 Å when measured by a feeler-type film thickness measuring apparatus.

EXAMPLE 2

Guide tracks were formed on the surface of a disk-shaped polycarbonate substrate with a diameter of 130 mm and a thickness of about 1.2 mm while the substrate was prepared by injection-molding.

A thin Sb-Cd-S film was vacuum-deposited on the above-prepared substrate by binary (Sb and CdS) vacuum-deposition using a vacuum-deposition apparatus employing the resistance heating method under the following conditions, so that a recording layer was formed on the substrate. Thus, optical information recording medium No. 2 according to the present invention was prepared.

Degree of vacuum: $6 \times 10^{-6}$ Torr
Deposition speed: Sb .. 10 Å/sec,
CdS .. 2 Å/sec It was confirmed by the Auger analytic device that the recording layer of the optical information recording medium No. 2 comprised a composition of $Sb_{0.7}Cd_{0.17}S_{0.13}$ with a uniform composition in the direction of the thickness thereof.

The thickness of the recording layer was 750 Å when measured by a feeler-type film thickness measuring apparatus.

EXAMPLE 3

Guide tracks were formed on the surface of a disk-shaped polycarbonate substrate with a diameter of 130 mm and a thickness of about 1.2 mm while the substrate was prepared by injection-molding.

A thin Sb-Zn-S-Pb film was vacuum-deposited on the above-prepared substrate by ternary (Sb, ZnS and Pb) vacuum-deposition using a vacuum-deposition apparatus employing the resistance heating method under the following conditions, so that a recording layer was formed on the substrate. Thus, optical information recording medium No. 3 according to the present invention was prepared.

Degree of vacuum: $6 \times 10^{-6}$ Torr
Deposition speed: Sb .. 10 Å/sec,
ZnS ..2Å/sec,
Pb ..1Å/sec It was confirmed by the Auger analytic device that the recording layer of the optical information recording medium No. 3 comprised a composition of $Sb_{0.62}Zn_{0.18}S_{0.16}Pb_{0.04}$ with a uniform composition in the direction of the thickness thereof.

The thickness of the recording layer was 750 Å when measured by a feeler-type film thickness measuring apparatus.

EXAMPLE 4

Guide tracks were formed on the surface of a disk-shaped polycarbonate substrate with a diameter of 130 mm and a thickness of about 1.2 mm while the substrate was prepared by injection-molding.

A thin Sb-Zn-S-Cr film was vacuum-deposited on the above-prepared substrate by ternary (Sb, ZnS and Cr) vacuum-deposition using a vacuum-deposition apparatus employing the resistance heating method under the following conditions, so that a recording layer was formed on the substrate. Thus, optical information recording medium No. 4 according to the present invention was prepared.

Degree of vacuum: $6 \times 10^{-6}$ Torr
Deposition speed: Sb .. 10 Å/sec,
ZnS .. 2 Å/sec,
Cr .. 1 Å/sec It was confirmed by the Auger analytic device that the recording layer of the optical information recording medium No. 4 comprised a composition of $Sb_{0.62}Zn_{0.18}S_{0.16}Cr_{0.04}$ with a uniform composition in the direction of the thickness thereof.

The thickness of the recording layer was 750 Å when measured by a feeler-type film thickness measuring apparatus.

EXAMPLE 5

Guide tracks were formed on the surface of a disk-shaped polycarbonate substrate with a diameter of 130 mm and a thickness of about 1.2 mm while the substrate was prepared by injection-molding.

A thin Sb-Zn-S-Al film was vacuum-deposited on the above-prepared substrate by ternary (Sb, ZnS and Al) vacuum-deposition using a vacuum-deposition apparatus employing the resistance heating method under the following conditions, so that a recording layer was formed on the substrate. Thus, optical information recording medium No. 5 according to the present invention was prepared.

Degree of vacuum: $6 \times 10^{-6}$ Torr
Deposition speed: Sb .. 10 Åsec,
ZnS .. 2 Å/sec,
Al .. 1 Å/sec It was confirmed by the Auger analytic device that the recording layer of the optical information recording medium No. 5 comprised a composition of $Sb_{0.62}Zn_{0.18}S_{0.16}Al_{0.04}$ with a uniform composition in the direction of the thickness thereof.

The thickness of the recording layer was 750 Å when measured by a feeler-type film thickness measuring apparatus.

EXAMPLE 6

Guide tracks were formed on the surface of a disk-shaped polycarbonate substrate with a diameter of 130 mm and a thickness of about 1.2 mm while the substrate was prepared by injection-molding.

A thin Sb-Sn-S film was vacuum-deposited on the above-prepared substrate by binary (Sb and SnS) vacuum-deposition using a vacuum-deposition apparatus employing the resistance heating method under the following conditions, so that a recording layer was formed on the substrate. Thus, optical information recording medium No. 6 according to the present invention was prepared.

Degree of vacuum: $6 \times 10^{-6}$ Torr
Deposition speed: Sb .. 10 Å/sec,
SnS .. 2 Å/sec It was confirmed by the Auger analytic device that the recording layer of the optical information recording medium No. 6 comprised a composition of $Sb_{0.7}Sn_{0.17}S_{0.13}$ with a uniform composition in the direction of the thickness thereof.

The thickness of the recording layer was 750 Å when measured by a feeler-type film thickness measuring apparatus.

EXAMPLE 7

Guide tracks were formed on the surface of a disk-shaped polycarbonate substrate with a diameter of 130 mm and a thickness of about 1.2 mm while the substrate was prepared by injection-molding.

A thin Sb-Pb-S film was vacuum-deposited on the above-prepared substrate by binary (Sb and PbS) vacuum-deposition using a vacuum-deposition apparatus employing the resistance heating method under the following conditions, so that a recording layer was formed on the substrate. Thus, optical information recording medium No. 7 according to the present invention was prepared.

Degree of vacuum: $6 \times 10^{-6}$ Torr
Deposition speed: Sb .. 10 Å/sec,
PbS .. 2 Å/sec It was confirmed by the Auger analytic device that the recording layer of the optical information recording medium No. 7 comprised a composition of $Sb_{0.7}Pb_{0.17}S_{0.13}$ with a uniform composition in the direction of the thickness thereof.

The thickness of the recording layer was in the range of 750 Å when measured by a feeler-type film thickness measuring apparatus.

EXAMPLE 8

Guide tracks were formed on the surface of a disk-shaped polycarbonate substrate with a diameter of 130 mm and a thickness of about 1.2 mm while the substrate was prepared by injection-molding.

A thin Sb-Sn-S-Pb film was vacuum-deposited on the above-prepared substrate by ternary (Sb, SnS and Pb) vacuum-deposition using a vacuum-deposition apparatus employing the resistance heating method under the following conditions, so that a recording layer was formed on the substrate. Thus, optical information recording medium No. 8 according to the present invention was prepared.

Degree of vacuum: $6 \times 10^{-6}$ Torr
Deposition speed: Sb .. 10 Å/sec,
SnS .. 2 Å/sec,
Pb .. 1 Å/sec It was confirmed by the Auger analytic device that the recording layer of the optical information recording medium No. 8 comprised a composition of $Sb_{0.62}Sn_{0.18}S_{0.16}Pb_{0.04}$ with a uniform thickness in the direction of the thickness thereof.

The thickness of the recording layer was 750 Å when measured by a feeler-type film thickness measuring apparatus.

EXAMPLE 9

Guide tracks were formed on the surface of a disk-shaped polycarbonate substrate with a diameter of 130 mm and a thickness of about 1.2 mm while the substrate was prepared by injection-molding.

A thin Sb-Sn-S-Cr film was vacuum-deposited on the above-prepared substrate by ternary (Sb, SnS and Cr) vacuum-deposition using a vacuum-deposition apparatus employing the resistance heating method under the following conditions, so that a recording layer was formed on the substrate. Thus, optical information recording medium No. 9 according to the present invention was prepared.

Degree of vacuum: $6 \times 10^{-6}$ Torr
Deposition speed: Sb .. 10 Å/sec,
SnS .. 2 Å/sec,
Cr .. 1 Å/sec It was confirmed by the Auger analytic device that the recording layer of the optical information recording medium No. 9 comprised a composition of $Sb_{0.62}Sn_{0.18}S_{0.16}Cr_{0.04}$ with a uniform composition in the direction of the thickness thereof.

The thickness of the recording layer was 750 Å when measured by a feeler-type film thickness measuring apparatus.

EXAMPLE 10

Guide tracks were formed on the surface of a disk-shaped polycarbonate substrate with a diameter of 130 mm and a thickness of about 1.2 mm while the substrate was prepared by injection-molding.

A thin Sb-Sn-S-Al film was vacuum-deposited on the above-prepared substrate by ternary (Sb, SnS and Al) vacuum-deposition using a vacuum-deposition apparatus employing the resistance heating method under the following conditions, so that a recording layer was formed on the substrate. Thus, optical information recording medium No. 10 according to the present invention was prepared.

Degree of vacuum: $6 \times 10^{-6}$ Torr
Deposition speed: Sb .. 10 Å/sec,
SnS .. 2 Å/sec,
Al .. 1 Å/sec It was confirmed by the Auger analytic device that the recording layer of the optical information recording medium No. 10 comprised a composition of $Sb_{0.62}Sn_{0.18}S_{0.16}Al_{0.04}$ with a uniform composition in the direction of the thickness thereof.

The thickness of the recording layer was 750 Å when measured by a feeler-type film thickness measuring apparatus.

EXAMPLE 11

Guide tracks were formed on the surface of a disk-shaped polycarbonate substrate with a diameter of 130 mm and a thickness of about 1.2 mm while the substrate was prepared by injection-molding.

A thin Sb-Sn-S-Au film was vacuum-deposited on the above-prepared substrate by ternary (Sb, SnS and Au) vacuum-deposition using a vacuum-deposition apparatus employing the resistance heating method under the following conditions, so that a recording layer was formed on the substrate. Thus, optical information recording medium No. 11 according to the present invention was prepared.

Degree of vacuum: $6 \times 10^{-6}$ Torr
Deposition speed: Sb .. 10 Å/sec,
SnS .. 2 Å/sec,
Au .. 1 Å/sec It was confirmed by the Auger analytic device that the recording layer of the optical information recording medium No. 11 comprised a composition of $Sb_{0.62}Sn_{0.18}S_{0.16}Au_{0.04}$ with a uniform thickness in the direction of the thickness thereof.

The thickness of the recording layer was 750 Å when measured by a feeler-type film thickness measuring apparatus.

COMPARATIVE EXAMPLE 1

A thin GeTe film was vacuum-deposited on the same substrate as employed in Example 1 using a vacuum-deposition apparatus employing the resistance heating method under the following conditions, so that a recording layer with a thickness of about 800 Å was formed on the substrate. Thus, comparative optical information recording medium No. 1 was prepared.

Degree of vacuum: $6 \times 10^{-6}$ Torr

Deposition speed: GeTe .. 10 Å/sec

It was confirmed that the recording layer of the comparative optical information recording medium No. 1 comprised a composition of $Ge_{0.4}Te_{0.6}$ with a uniform thickness in the direction of the thickness thereof.

Each of the optical information recording media No. 1 to No. 11 according to the present invention and the comparative optical information recording medium No. 1 was incorporated in an optical disk tester, and a recording and reproduction test was carried out with a laser beam wavelength of 780 nm, the numerical aperture of the lens of 0.5, a linear velocity of 11.3 m/sec, laser power for recording of 4 mW, and laser power for reproduction of 0.5 mW, at information signal frequencies of 7.5 MHz and 3.7 MHz. The reproduction C/N ratio was measured at a band width of 30 KHz.

The results are shown in Table 1.

TABLE 1

|  | C/N Ratio (3.7 MHz) | C/N Ratio (7.5 MHz) |
| --- | --- | --- |
| Example 1 | 50 dB | 46 dB |
| Example 2 | 50 | 45 |
| Example 3 | 48 | 45 |
| Example 4 | 50 | 46 |
| Example 5 | 49 | 45 |
| Example 6 | 52 | 47 |
| Example 7 | 52 | 46 |
| Example 8 | 53 | 47 |
| Example 9 | 52 | 45 |
| Example 10 | 51 | 45 |
| Example 11 | 50 | 45 |
| Comparative Example 1 | 52 | 35 |

As can be seen from Table 1, a C/N ratio of as high as 45 dB or more can be obtained with the optical information recording media according to the present invention.

Furthermore, when the recording pits formed on the recording layer of the optical information recording media according to the present invention were observed by a scanning electron microscope (SEM), they were not deformed.

As previously mentioned, information is recorded on the optical information recording medium according to the present invention in such a fashion that an optical constant, such as the refractive index of the recording layer thereof is caused to change by the application of a recording beam thereto. The protective layer can be formed on the recording layer of this recording medium. Therefore, the preservation stability of the recording layer can be improved.

Furthermore, since the optical constant of the recording layer of the optical information recording medium according to the present invention is switched with high sensitivity at high speed, a high reproduction C/N ratio can be obtained with a small laser beam intensity even when the recording and reproduction operations are performed at a frequency of 7.5 MHz and at a high linear velocity of 11.3 m/sec.

What is claimed is:

1. An optical information recording medium comprising a substrate and a recording layer, formed on said substrate, said recording layer comprising a composition comprising (i) antimony, (ii) sulfur, and (iii) tin, said composition having the formula $Sb_xSn_yS_zA'_\alpha$, in which $A'$ represents an element other than Sn selected from the class consisting of the elements which belong to group IVB, group VB, group VIB, group VIIB, group VIII, group IB, group IIB, group IIIA and group IVA of the periodic table, oxygen and nitrogen; $0.5 \leq x < 1$; $0 < y < 0.5$; $0 < z < 0.5$; $0 < \alpha < 0.5$; and $x+y+z+\alpha=1$.

2. The optical information recording medium as claim in claim 1, wherein $\alpha=0$.

3. The optical information recording medium as claimed in claim 1, wherein $0 < \alpha$.

4. The optical information recording medium as claimed in claim 1, wherein said recording layer has a thickness ranging from 100 to 3000 Å.

5. The optical information recording medium as claimed in claim 1, further comprising an undercoat layer, formed between said substrate and said recording layer.

6. The optical information recording medium as claimed in claim 1, further comprising a protective layer, formed on said recording layer.

* * * * *